Figure 1:
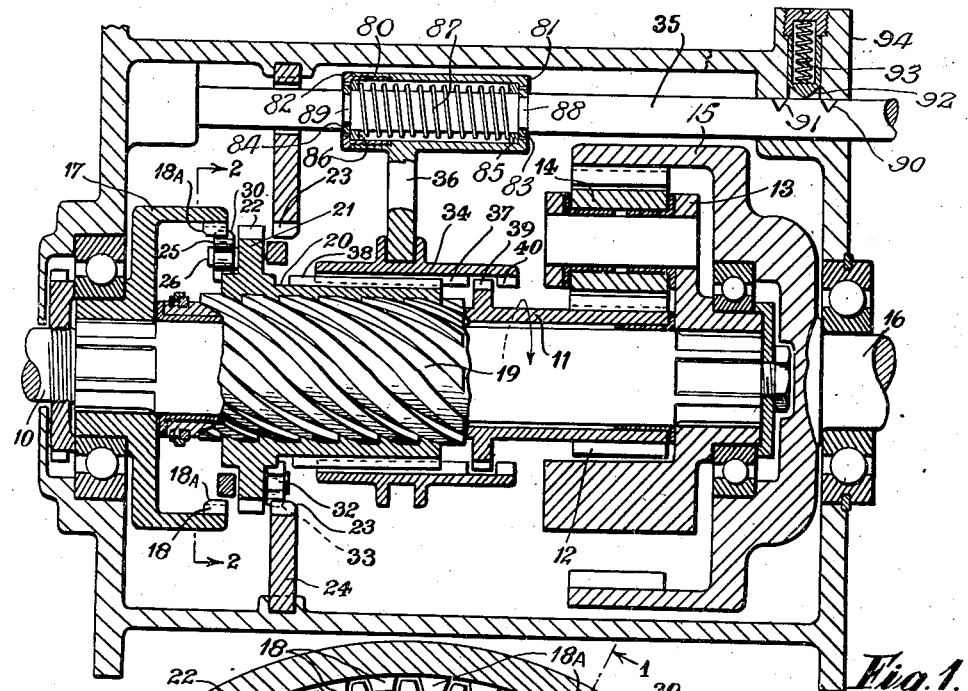

Dec. 10, 1940.  H. SINCLAIR  2,224,322

SYNCHRONIZING CLUTCH

Filed Jan. 30, 1940  2 Sheets-Sheet 1

Inventor
Harold Sinclair
by
Dean Fairbanks & Hirsch

Dec. 10, 1940. H. SINCLAIR 2,224,322
SYNCHRONIZING CLUTCH
Filed Jan. 30, 1940 2 Sheets-Sheet 2
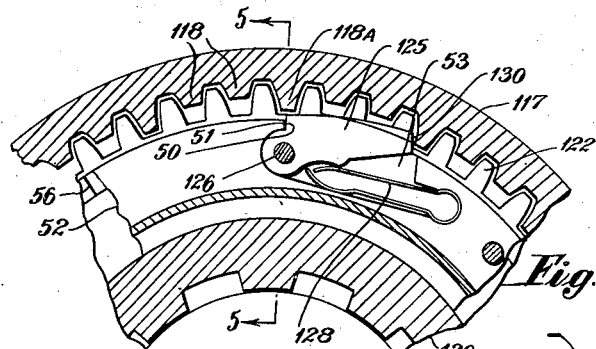
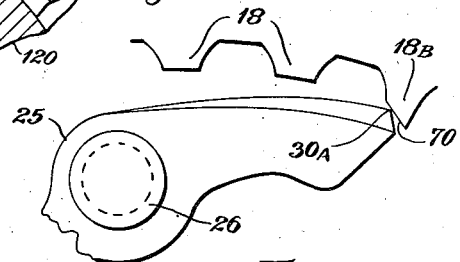
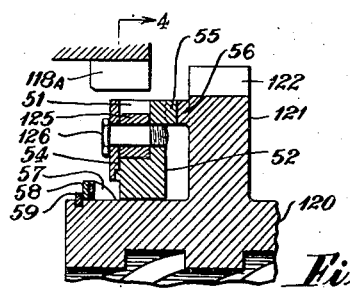
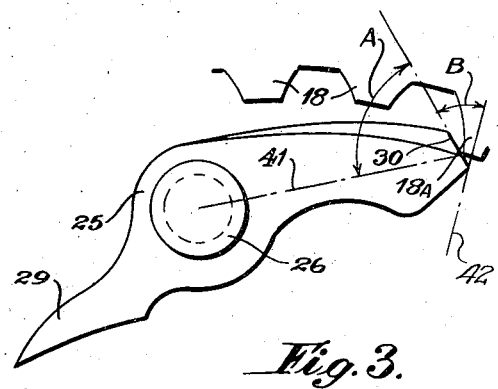
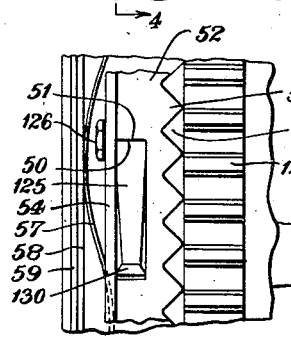
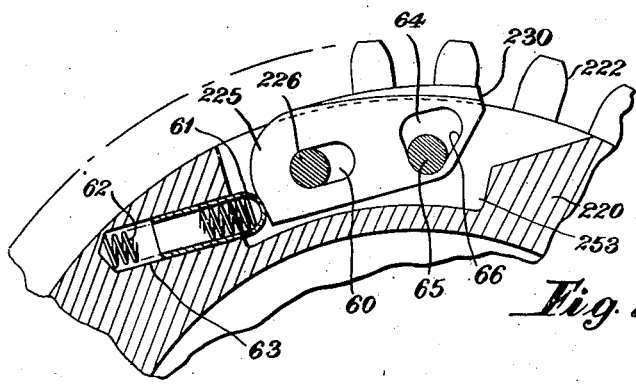
Inventor
Harold Sinclair
by Patented Dec. 10, 1940

2,224,322

UNITED STATES PATENT OFFICE 2,224,322

SYNCHRONIZING CLUTCH

Harold Sinclair, Kensington, London, England

Application January 30, 1940, Serial No. 316,307
In Great Britain January 26, 1939

11 Claims. (Cl. 192—48)

This invention relates to mechanical coupling means of the synchronizing coupling type for conveying or preventing rotary motion, such for instance as the Legge synchro-coupling, examples of which are described in Patent No. 1,862,188 of Norton Legge and the specification of my patent application Serial No. 169,973 filed October 20, 1937.

The type of synchronizing coupling means with which this invention is concerned comprises a toothed first member (which may be the driving member or a driven member or a stop member), a second member (which may be the driven or stop member, or the driving member respectively), an intermediate member so engaged with the second member as to be constrained to move helically with respect thereto in consequence of relative rotation between the intermediate and second members, the intermediate member having teeth engageable with the teeth on the first member, and a subsidiary ratchet drive adapted to couple together the first and intermediate members and so arranged as to effect engagement of the teeth of the first and intermediate members without clashing on relative angular displacement of the first and second members in one sense. In the preferred construction the subsidiary ratchet drive includes a pawl displaceably mounted on the first member or on the intermediate member and co-operating with teeth—preferably the said teeth—on the intermediate member or the first member respectively.

In the normal operation of such synchronizing coupling means, the torque load transmitted by the subsidiary ratchet drive is no more than that required to displace the intermediate member on the second member, since the arrangement is such that, during engagement together of the teeth on the first and intermediate members, the ratchet drive becomes inoperative before these teeth are fully engaged.

Under certain circumstances, however, as for example when a plurality of Legge synchro-couplings or a double Legge synchro-coupling is used as gear-selecting clutch means in change-speed gearing, abnormal conditions may arise, such as the involuntary reversal of the input or the output shaft of the gearing during operating of the gear-changing control means, which cause an unduly high torque to be applied to the subsidiary ratchet drives, and an object of this invention is to provide an improved construction which eliminates any risk of damage due to excessive torque on the subsidiary ratchet drive.

According to this invention in synchronizing coupling means of the type hereinbefore set forth the subsidiary ratchet drive comprises means which enable it to automatically slip in consequence of the application of an excessive torque through it and which, when the conditions producing such excessive torque no longer exist, leave the ratchet drive in condition to perform its normal synchronizing function.

In the preferred construction in accordance with this invention, an abutting surface on the nose of the pawl of the subsidiary ratchet drive, or the tooth portions with which this nose co-operates, or both of these surfaces, are inclined in such a manner that excessive torque loading transmitted through the pawl will displace it out of engagement with the tooth. When the pawl is on a rotatable member, the pawl is preferably biased towards its engaging position by a relatively light spring and so arranged that its bias is increased by the effect of centrifugal force upon rotation of the member on which the pawl is mounted.

Figure 2:
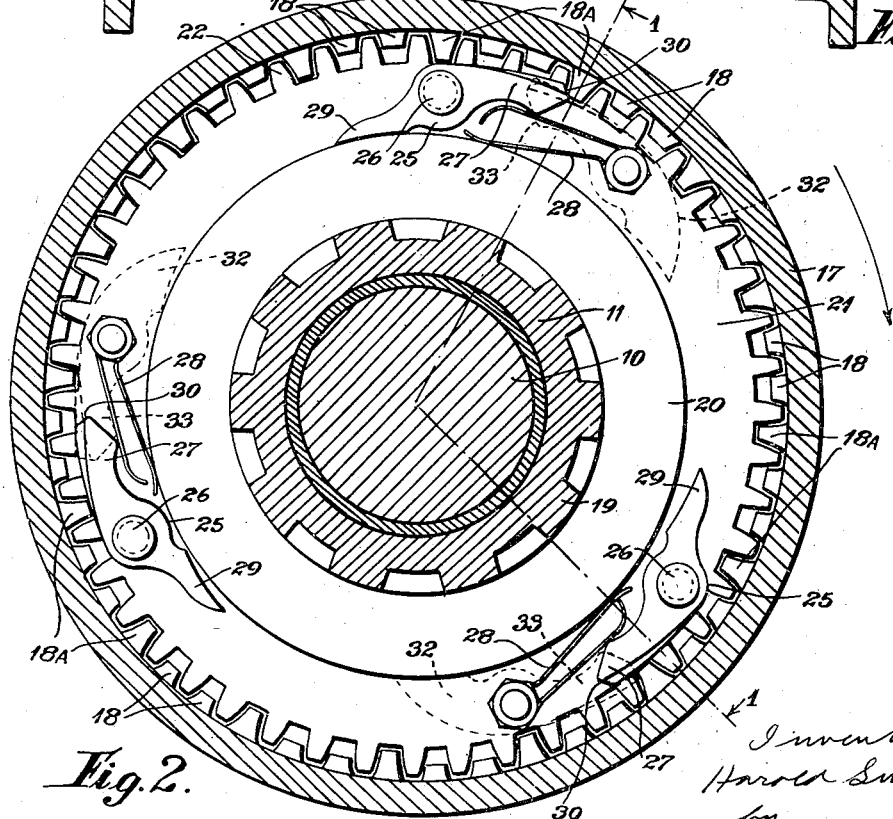

The invention will be further described by way of example with reference to the accompanying drawings, in which:

Fig. 1 is a sectional side elevation of a planetary two-speed gear, a part being shown in section on the line 1—1 in Fig. 2, Fig. 2 is a section to a larger scale on the line 2—2 in Fig. 1, Fig. 3 is an end elevation of a pawl to a still larger scale, Fig. 4 is a section of part of a modified arrangement of synchronous coupling, taken on the line 4—4 in Fig. 5, Fig. 5 is a section on the line 5—5 in Fig. 4, Fig. 6 is a developed view of the right-hand coupling part of Fig. 5, Fig. 7 is a sectional end elevation of part of a further modification, and Fig. 8 shows a modification of the pawl arrangement shown in Fig. 3.

The gear shown in Fig. 1 is suitable for use between an internal-combustion engine and another change-speed gear. The input shaft 10 of the gear passes through a sleeve 11 on which is formed a sun pinion 12. A planet carrier 13 is fixed to the input shaft and carries planet wheels such as 14. An annulus gear drum 15 is fixed to the output shaft 16. A drum 17 is provided with for example forty-eight teeth consisting of sixteen uniformly-spaced full-depth teeth 18A and thirty-two shallow teeth 18 cut back to the pitch circle. This drum 17 is fixed to the input shaft 10 and forms the first member of a double Legge synchro-coupling. The second member of this coupling is formed by the sun sleeve 11, which has a right-handed screw thread 19 of steep pitch on its exterior. The intermediate member of the synchro-coupling is a nut 20 engaged on this screw thread and provided with a flange 21 having on its periphery forty-eight jaw-clutch teeth 22 engageable, when the nut is in its extreme left-hand position (as viewed in Fig. 1), with the teeth 18 and 18A on the input drum 17, and, when the nut is in its extreme right-hand position, with forty-eight jaw clutch teeth 23 on a fixed ring 24 forming the reaction element of the gearing. On the front of the flange 21 are mounted three uniformly-spaced pawls 25 journalled on pins 26. Each pawl has a nose 27 which points forwards (i. e. in the normal direction of rotation of the input shaft) and which is biassed outwards by a light spring 28. Each pawl also has a tail 29 which is adapted to bear on the body of the nut 20 and thus limit the outward displacement of the nose. The pawls are so shaped that their noses are substantially heavier than their tails. When the nut is in its mid position as shown in Fig. 1, the pawls 25 are in register with the deep teeth 18A and are thus in a position to cooperate with them (as shown in Fig. 2).

The noses 27 of the pawls are provided with abutting surfaces 30 which are inclined to tangents to their path of displacement about the pins 26, the inclination being such that the pawls will slip inwards out of engagement with any tooth 18A on the occurrence of an excessive torque through them. In the example shown, when the nose of a pawl 25 is engaged behind a tooth 18A, the abutting surface 30 preferably lies at an angle A (Fig. 3) of between 77 and 79 degrees to the line of action 41 of the pawl, i. e. a line joining the axis of the pin 26 to the point of contact of the surface 30 and the tooth 18A. It is convenient to position the pin 26 so that the surface 30 lies at an angle B of between 38 and 40 degrees with a line 42 bisecting the tooth 18A and radiating from the axis of rotation of the gear.

On the rear of the flange 21 are mounted pawls 32 the noses 33 of which trail with respect to the forward direction of rotation. These pawls may be shaped in known manner.

The nut is capable of being locked in both of its end positions by means of a sleeve 34 adapted to be slid axially by preselector control means including a slidable rod 35 and a yoke 36 resiliently coupled thereto. The yoke 36 has a tubular boss 80 provided at its ends with inturned flanges 81 and 82 which normally register with collars on the rod 35. These collars are in the form of snap rings 83 and 84 engaged in grooves 88 and 89 in this rod. Washers 85 and 86, which are an accurate sliding fit on the rod 35 and within the boss 80, are urged apart by a relatively light compression spring 87 to cooperate with the flanges 81 and 82 and with the collars 83 and 84. The rod 35 is provided with two notches 90 and 91 cooperating with a locating plunger 92 slidable in a bore in the gear case 94 and loaded by a relatively stiff compression spring 93. The locking sleeve 34 has internal axial splines 37 engaged with splines 38 on the nut and engageable, only when the nut is in its extreme right-hand position, with splines 39 on the sleeve 11. The locking sleeve is provided also with splines 40 which are staggered circumferentially with respect to the splines 37 and are engageable with the splines 39 only when the nut is in its extreme left-hand position.

This gear operates as follows. The normal, forward direction of rotation of the shafts 10 and 16 is indicated by arrows in Figs. 1 and 2. On direct drive (low speed gear) the nut 20 and the locking sleeve 34 will be in their extreme left-hand positions, the teeth 22 being engaged with the teeth 18 and 18A, the splines 40 on the sleeve 34 engaged with the splines 39 on the sleeve 11, and the locating plunger 92 engaged in the notch 90. Under these conditions the planetary gear train rotates as a unit.

In order to change to high speed while the gear is running, the rod 35 is shifted to the right so as to engage the plunger 92 in the notch 91. The yoke 96 and the locking sleeve 34 are consequently shifted to the position shown in Fig. 1, but since the splines 37 do not register with the gaps between the splines 39 while the nut is not in its extreme right-hand position, the parts 36 and 34 are thereby prevented from shifting further to the right. Consequently the collar 84 slides the washer 86 to the right relatively to the boss 80, compressing the spring 87 against the washer 85 which is retained by the flange 81. The engine is now retarded. Owing to the action of the planetary gear train and the inertia of the parts driven by the output shaft 16, the speed of the sleeve 11 drops faster than that of the teeth 18 and 18A rotating with the input shaft 10. The nut is accordingly caused, by the reaction torque load on the screw thread 19 under overrunning conditions, to move to the right until the teeth 22 are disengaged from the teeth 18 and 18A. The pawls 25 and 32 now ratchet over the teeth 18, 18A and 23 respectively, and as soon as the engine speed falls to a value such that the sun sleeve 11 begins to rotate backwards, i. e., oppositely to the direction denoted by the arrows in Figs. 1 and 2, a pawl 32 engages a tooth 23 and establishes through the screw thread 19 an overrunning torque load which causes the nut to move to its extreme right hand position, the pawls 32 being so positioned as to cause engagement of the teeth 22 and 23 without clashing. The shafts 10 and 16 are thus synchronized in the overdrive ratio under the overrunning torque. As such synchronism is established by the full interengagement of the teeth 22 and 23, the splines 37 and 39 come into meshing register and the spring 87 operates to move the locking sleeve to the right to engage the splines 37 and 39 and thereby lock the nut. The engine is now accelerated again, and since the nut 20 is prevented by the locking sleeve 34 from moving to the left under the influence of the torque reaction on the screw thread 19 under driving conditions, the teeth 22 and 23 remain engaged together and the overdrive ratio is kept engaged.

In order to change to low speed, the rod 35 is shifted to the left to disengage the locating plunger 92 from the notch 91 and engage it in the notch 90. Since driving torque reaction maintains the engaged splines 37 and 39 under load, the friction due to such load prevents the locking sleeve 34 from being shifted to the left so that the collar 83 slides the washer 85 to the left relatively to the boss 80, compressing the spring 87 against the washer 86 which is retained by the flange 82. Next the engine is momentarily retarded to eliminate the torque from the locking sleeve, which thereupon moves to the position shown in Fig. 1, under the influence of the spring 87. As the engine accelerates again, the sleeve 11 begins to rotate forwards, i. e., in the direction indicated by the arrows in Figs. 1 and 2, and the nut 20 is moved to the left by the reaction torque load on the screw thread 19 under driving conditions, until the teeth 22 disengage from the teeth 23. The teeth 23 and 18A now ratchet over the pawls 32 and 25 respectively, and, as soon as the sleeve 11 begins to rotate faster than the shaft 10, a pawl 25 engages a tooth 18A, causing the nut to move to its extreme left-hand position, the pawls 25 being so positioned as to cause engagement of the teeth 22 with the teeth 18 and 18A without clashing, whereupon the splines 40 are brought into register with the gaps between the splines 39, so that the locking sleeve 34 moves to the left, under the influence of the spring 87, locking the gear in direct drive.

Now, assume that the nut 20 is in its extreme left-hand position (direct drive), that the engine and gearing are at rest, and that the selector rod 35 is moved to the right to preselect the high-speed gear. The locking sleeve 34 will move to the position shown in Fig. 1, unlocking the nut. Assume further that an attempt is made to start the engine and that, owing for example to pre-ignition, it rotates backwards, i. e., counter to the direction indicated by the arrows in Figs. 1 and 2, for one or two revolutions. When the shaft 10 rotates backwards, the shaft 16 being at rest, the sleeve 11 is caused to rotate backwards faster than the shaft 10 and the drum 17 fixed to this shaft, with the result that the nut 20, which is unlocked, is moved to the right along the screw thread 19 by the co-operation of the teeth 18 and 18A on the drum with the teeth 22. When the nut reaches substantially the position shown in Fig. 1, a pawl 32 engages a tooth 23 and thereby stops rotation of the nut while a pawl 25 is still engaged with a tooth 18A. If these pawls were incapable of disengagement under these conditions, they would transmit the whole of the reverse torque from the shaft 10 to the fixed ring 24 and would thus be liable to be broken. However, owing to the obliquity of the abutting surfaces 30 of the noses of the pawls 25, these pawls disengage automatically from the teeth 18A as soon as the torque load on them becomes excessive, and in this way risk of damage is eliminated.

In the course of gear changing during normal running, the nut 20 will be rotating when the pawls 25 are required to engage the teeth 18A, and since these pawls are nose-heavy, centrifugal force will assist the action of the pawl springs 28 and eliminate any risk of failure of the pawls to operate properly under their normal working load.

As an alternative the subsidiary ratchet drive path may include a ratchet device which is incapable of disengagement on overload and which is connected in series with a subsidiary clutch device adapted to slip under overload and to be restored to its normal driving condition only when its driving and driven elements are in an angular relationship such that the subsidiary ratchet drive is capable of synchronizing the coupling teeth.

Such an arrangement is shown in Figs. 4, 5 and 6, in which parts corresponding to equivalent parts in Fig. 1 are given the reference numerals of the latter increased by 100. In this modification each pawl 125 has an abutting surface 130 which is tangential to its path of displacement about the pawl pivot pin 126, so that there is no tendency for the pawl to slip out of engagement with any tooth 118A on the occurrence of excessive torque. The pawl is provided with a step 50 adapted to engage a stop 51 formed in a ring 52 which is provided with a recess 53 shaped to receive the pawl and the pawl spring 128. An annular cover plate 54 held by the pawl pins 126 retains the pawls and pawl springs in the recesses 53. The ring 52 is provided with zig-zag serrations 55 normally held in mesh with similar serrations 56 on the nut flange 121 by the agency of a spring washer 57 placed between the ring 52 and a washer 58 held by a snap ring 59 engaged in the nut 120. The serrations have a pitch equal to the pitch of the teeth 122 and are so disposed that the pawls are normally properly located in the circumferential direction with respect to the teeth 122. Should however a sufficient overload accidentally come on a pawl 125, the serrations will ride over each other, the ring 52 moving to the left (as seen in Figs. 5 and 6) and rotating relatively to the nut 120. As soon as the overload is relieved, the spring 57 ensures that the ring 52 returns to its normal position relative to the nut with the serrations fully meshed together, so that the pawls are again ready to effect synchronous engagement of the teeth 118 and 118A with the teeth 122.

As a further alternative, the subsidiary ratchet drive may comprise a pawl which is displaceable in the circumferential direction relatively to the part on which it is mounted and against the influence of a spring which normally retains the pawl in engagement with a stop limiting such displacement in the direction in which the pawl nose faces, and means co-operating with the pawl for retracting it in consequence of its circumferential displacement in the other direction. Thus in Fig. 7 the pawl 225, which is accommodated in a recess 253 in the nut 220 and which serves to guide jaw-clutch teeth (not shown) into synchronous engagement with the teeth 222 on the nut, is provided with a slotted hole 60 through which passes the pivot pin 226. A plunger 61, loaded by a strong compression spring 62 and slidable in a bore 63 in the nut 220, engages the rear end of the pawl at a position offset with respect to the slot 60 in such a manner that the pawl is kept at the limit of its range of circumferential displacement at which the abutting surface 230 on the nose is positioned to cause synchronous engagement of the jaw clutch teeth and that at the same time the nose of the pawl is urged radially outward. A triangular aperture 64 in the pawl accommodates a pin 65 fixed in the nut 220, which pin both acts as a stop limiting the outward movement of the pawl and co-operates with the oblique surface 66 of the aperture 64. If an excessive force is applied to the nose of the pawl, sufficient to compress the spring 62, the pawl moves circumferentially in the nut and the pin 65, riding up the oblique surface 66, depresses the nose of the pawl out of engagement with the clutch tooth which is applying the excessive force.

In this example also the pawl is of such a shape that the bias of the pawl towards its engaging position is increased by the effect of centrifugal force upon rotation of the nut 220.

The construction shown in Fig. 8 is similar to that shown in Fig. 3, except that the nose of the pawl 25 is provided with an abutting edge 30A, while the tooth 18B is provided with a face portion 70 with which this abutting edge co-operates and which is so inclined that excessive torque loading transmitted through the pawl will rock it clockwise out of engagement with the tooth 18B.

I claim:

1. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member, and a subsidiary ratchet drive adapted to couple together said first and intermediate members and so arranged as to effect engagement of the teeth of said first and intermediate members without clashing on relative angular displacement of said first and second members in one sense, said subsidiary ratchet drive comprising means which enable it to slip automatically in consequence of the application of excessive torque through it and which, when the conditions producing such excessive torque no longer exist, leave the ratchet drive in condition to perform its normal function.

2. Synchronizing coupling means comprising a toothed first member, a second member rotatable relatively to said first member, a toothed intermediate member so engaged with said second member as to be constrained to move helically with respect thereto in consequence of relative rotation between said intermediate and second members, a subsidiary ratchet drive including a pawl carried by one of said toothed members and capable of co-operating with the teeth on the other of said toothed members, said pawl being positioned to guide the teeth with which it co-operates smoothly into engagement with the teeth on said one of the toothed members on relative angular displacement of said first and second members in one sense, said subsidiary ratchet drive including means capable of interrupting the drive therethrough in consequence of the subsidiary drive torque exceeding a predetermined value.

3. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member in consequence of such helical movement, and auxiliary coupling means comprising a ratchet connection between said toothed members for maintaining their teeth aligned for smooth engagement together when said relative rotation occurs in one sense, said auxiliary coupling means permitting relative rotation of said teeth both when said relative rotation occurs in the other sense, and when said relative rotation occurs in said one sense and said pawl is excessively loaded owing to abnormal restraint of movement of said intermediate member.

4. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member, and a pawl on one of said toothed members for co-operation with a set of teeth on the other of said toothed members and so positioned as to guide said toothed members smoothly into mesh with each other on relative angular displacement of said first and second members in one sense, at least one of the co-operating surfaces of said pawl and said set of teeth being so inclined that excessive torque loading transmitted through the pawl will displace it out of engagement with any tooth of said set.

5. Synchronizing coupling means as claimed in claim 4, wherein said pawl is so shaped and mounted that its bias towards its engaging position is increased by the effect of centrifugal force upon rotation of the one of said toothed members on which said pawl is mounted.

6. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member, and a pawl on one of said toothed members for co-operation with at least some of the teeth on the other of said toothed members and so positioned as to guide said toothed members smoothly into mesh with each other on relative angular displacement of said first and second members in one sense, the abutting surface of the nose of said pawl being so inclined that excessive torque loading transmitted through the pawl will displace it out of engagement with any of the teeth that co-operate therewith.

7. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member, and a subsidiary ratchet drive adapted to couple together said first and intermediate members and so arranged as to effect engagement of the teeth of said first and intermediate members without clashing on relative angular displacement of said first and second members in one sense, said subsidiary ratchet drive including a ratchet device connected in series with a subsidiary clutch device capable of slipping on overload and of being restored to its normal driving condition only when its driving and driven elements are in an angular relationship such that the subsidiary ratchet drive is capable of synchronizing the coupling teeth.

8. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member, and a subsidiary ratchet drive adapted to couple together said first and intermediate members and so arranged as to effect engagement of the teeth of said first and intermediate members without clashing on relative angular displacement of said first and second members in one sense, said subsidiary ratchet drive including a ratchet clutch in series with a clutch the two parts of which are urged together by a spring and are provided with co-operating zig-zag serrations having a pitch corresponding to the pitch of the teeth of said ratchet clutch.

9. Synchronizing coupling means comprising a toothed first member, a second member rotatable relatively to said first member, an intermediate member so engaged with said second member as to be constrained to move helically with respect thereto in consequence of relative rotation between the intermediate and second members, the intermediate member having teeth engageable with the teeth on the first member, a pawl on one of said toothed members for cooperation with at least some of the teeth on the other of said toothed members, said pawl being displaceable in the circumferential direction relatively to the said member on which it is mounted, a spring normally retaining said pawl in engagement with a stop limiting such displacement of the pawl in the direction in which the pawl nose faces, and means for retracting said pawl in consequence of its circumferential displacement in the other direction.

10. Synchronizing coupling means as claimed in claim 9, wherein said spring also serves to rock said pawl into its engaging position.

11. Synchronizing coupling means comprising a toothed first member, a second member, a toothed third member, said three members being capable of relative rotation, a toothed intermediate member capable of moving axially into engagement with said first and third members alternatively and being so engaged with said second member as to be constrained to move helically with respect thereto in consequence of relative rotation between said intermediate and second members, a resiliently-biased pawl on one of said first and intermediate members co-operating with teeth on the other of said last-mentioned two members, a resiliently biased pawl on one of said intermediate and third members co-operating with teeth on the other of said last-mentioned two members, said pawls being so positioned as to effect respectively the said alternative engagements of the teeth of said intermediate member without clashing, on relative angular displacement of said first and second members in one sense and on relative angular displacement of said third and second members in the opposite sense, at least one of the co-operating abutting surfaces of one of said pawls and any of said teeth with which it constitutes a ratchet drive being so inclined with respect to the line of action of the pawl that the pawl will move to a disengaged position on the occurrence of excessive torque load thereon.

HAROLD SINCLAIR.